UNITED STATES PATENT OFFICE 2,692,856

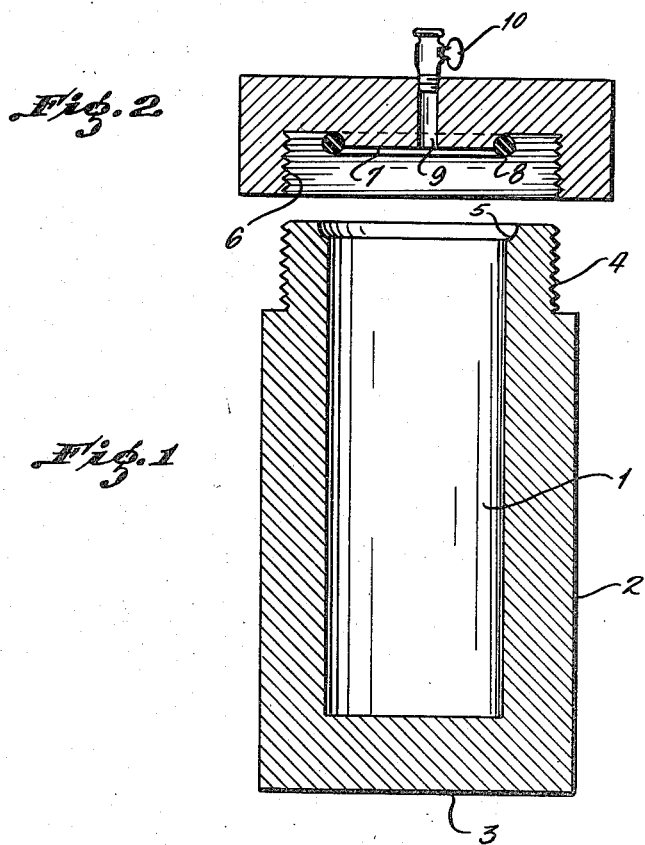
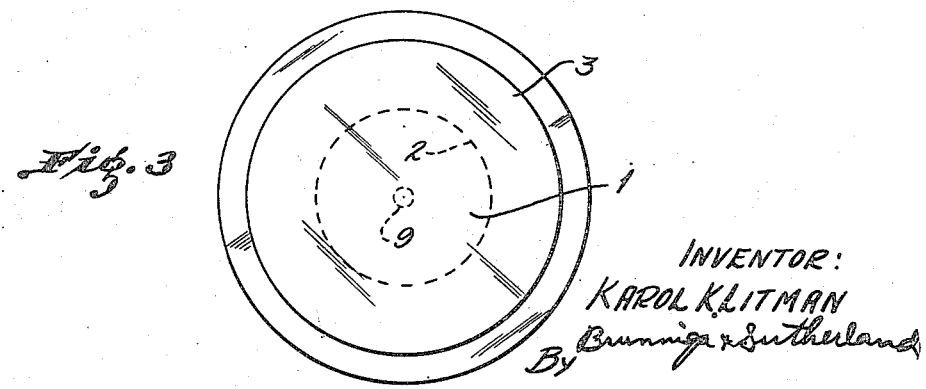

TREATMENT OF DRILLING FLUIDS

Karol K. Litman, Corpus Christi, Tex., assignor to National Lead Company, New York, N. Y., a corporation of New Jersey Application December 22, 1950, Serial No. 202,215

5 Claims. (Cl. 252—8.5)

This invention relates to the treatment of drilling fluids such as are used in the drilling of oil and gas wells by the rotary method; and more particularly to the treatment and maintenance of muds consisting predominantly of clay and water and certain other chemicals so that such muds will be maintained in good condition in spite of high bottom hole temperatures and pressures.

In the drilling of wells by the rotary method a mud fluid is circulated through the drill pipe, thence through holes in the bit and thence upward in the annular space between the drill pipe and the walls of the hole whence it issues to the surface, and after depositing its burden of cuttings is taken up again by the pumps and pumped down the drill pipe. Such a fluid performs the functions of removing cuttings from the hole so that drilling can proceed continuously, of lubricating and cooling the bit, and of confining fluids originally present in the formations penetrated in their respective formations during the course of drilling, and of preventing or inhibiting the collapse or sloughing of shaly and sandy formations. A rather complete discussion of such mud fluids generally is given in the Harth Patent 1,991,637.

The great majority of the muds now in use consist for the most part of clays and other siliceous minerals, derived in part from surface clays deliberately added to the mud, and in part from shales drilled up during the course of drilling and thus incorporated into the muds, all rendered fluid by dispersion in water. In many cases, weighting material, such as finely ground barytes is added to achieve a mud density in excess of that which could be obtained by the use of clay and water alone. In some cases it is necessary to maintain the mud at great densities, often more than twice the density of water, that is 16 or 17 lbs. per gallon or higher. In the past, such muds have been generally used at the high temperatures and high pressures prevailing at great depths without marked difficulties other than those to be expected from increased hydration of shales and clays at high temperatures, and the usual difficulties arising from sloughing, caving and swelling formations. The muds themselves, however, appeared to be relatively unchanged by the temperatures and pressures encountered.

Since the early 1930's, attempts have been made to counteract the tendency of colloidal shales to make up into drilling mud when drilled up and thus entrained in the mud, by the use of thinning agents such as the condensed phosphates. Such treatments are difficult to carry out continuously, however, so that still more recently a type of mud has become popular and widely used, particularly where large sections of mud making shales are drilled through, consisting of a clay-water mud, with or without weighting material, which has been raised to a pH of about 12½ by the addition of caustic soda and generally some lime, that is, calcium hydroxide, and substantial amounts of a complex, weak organic acid such as tannic acid or humic acid. Very often starch, in its colloidal or gelatinized form, is used as well, primarily for the purpose of reducing filter cake permeability and thus reducing the amount of water which escapes from the borehole during drilling. Typical muds of this type will be compounded with 100 lbs. or more of shale or clay per barrel of mud, 4 to 10 lbs. per barrel of crude tannic acid such as quebracho extract or other materials serving a similar purpose; 2 to 8 lbs. per barrel of caustic soda, that is, sodium hydroxide, and about 2 to 6 lbs. per barrel of lime, that is, calcium hydroxide. It will be understood that these are the approximate typical quantities which would be used in preparing a mud of this type in the first instance, and they may be considered as the quantities of such materials effectively present in any such mud at any given time. However, because of loss of the soluble constituents of such a mud by the filtration of the fluid phase of the mud; reaction of the alkalis, particularly the lime, with the other constituents of the mud, particularly the clays and shales; absorption by the mud of carbon dioxide from the air with the consequent production of calcium carbonate and other carbonates; oxidation of the organic substances present; degradation of any carbohydrate colloids present, such as starch or cellulose derivatives; and similar effects, it is necessary to add make-up quantities of the various treating agents from time to time during the course of drilling, generally more or less continuously but usually at least daily. Thus in the maintenance of a mud of the type described during drilling through mud making formations, typical make-up quantities of the various materials needed to maintain the mud in satisfactory condition with substantially uniform characteristics will be perhaps ½ to 2 lbs. per barrel of weak organic acid such as quebracho extract, ½ to 2 lbs. per barrel of carbohydrate colloid such as starch, ½ to 1 lb. per barrel of caustic soda and ½ to 1 lb. of lime per barrel, all of these quantities being the total daily addition for a 24-hour period of drilling. The volume unit used is the standard petroleum barrel of 42 U. S. gallons.

When muds of this type, having a pH in excess of 12 maintained with caustic soda and lime, are used at great depths and particularly where high bottom hole temperatures are encountered, peculiar difficulties have been encountered. For example, in some cases upon withdrawal of the drilling tools from the hole for a bit change, upon attempting to return the bit to bottom it has been found that the apparent bottom of the hole is several hundred feet higher than before. Where circulation has been suspended for any reason, the lower end of the drill pipe has occasionally "frozen," that is, become stuck in the hole. Such occurrences have been more or less of a mystery, particularly when they took place in formations which were reasonably believed to be competent and not subject to sudden collapse.

I have discovered the cause of many such untoward occurrences, have developed a method for determining when a mud is subject to changes bringing on such occurrences and have moreover discovered methods of treatment of muds so that they can be used under extreme conditions of temperature and pressure with the complete avoidance of such difficulties. Briefly, I have found that muds of the high pH type, particularly when containing a large proportion of clay or shale solids, are generally subject at extreme temperatures to a permanent conversion to another type of silicate resembling Portland cement in properties. Thus, just as a freshly prepared slurry of Portland cement and water is fluid but upon standing the chemical reactions taking place are such as to bind the water and the solids into a single mass, so it appears that in the mixture of alkali clay, shale, silt and water of muds of this type the high temperature converts the whole mass into a solid. Indications are that the clays and shales are converted into different types of silicates, probably with the uptake of the water present and the subsequent solidification into a coherent hard mass. There may be a reaction also between the quartz constituents and the alkalis present in the mud.

One of the objects of the invention is to provide a method for determining when a mud is subject to temperature-induced solidification or thickening.

Another object of the invention is to provide a means for determining optimum conditions of maintenance of muds of the high pH type so that solidification can be avoided.

Another object of the invention is to provide a method of treatment and/or maintenance of a high pH mud for drilling at great depths and/or high temperatures so that solidification or undue thickening can be avoided.

Another object is to provide a means of testing a high pH mud of the clay-water type so that such a mud may be continuously maintained in a state free of solidification tendencies.

Other objects of the invention will appear as the description thereof proceeds.

In the drawing, Figure 1 is a pressure vessel, of generally cylindrical shape and closed at the lower end, and Figure 2 is a cap therefor, of such a nature that a tight seal can be effected. Figure 3 is an end-on view of the assembled vessel (Figures 1 and 2) as viewed from the bottom.

Referring to Figure 1, this is a cylinder which may be conveniently machined from a single piece of steel or stainless steel bar. A convenient size is 2½ inches in outside diameter. A hollow portion 1 is bored from one end, leaving sufficiently thick walls 2 and 3 so that the highest pressures built up in the vessel will not distort or break it. Threads to engage the cap are shown at 4 and a recess for setting an O ring is shown at 5.

Referring to Figure 2, this is a cap which again may be conveniently machined from a single bar of steel or stainless steel and somewhat larger in diameter than the diameter of the stock of Figure 1. Threads are shown at 6 which engage the threads previously described on the cylinder of Figure 1. A boss is left on the inner portion of the cap 7 for the engagement of an O ring 8. A vent is drilled in the top of the cap 9 closed by a high pressure valve 10 whereby pressure can be conveniently "bled" from the vessel.

In use, the chamber 1 of the testing device is filled or nearly filled with the mud to be tested. The cap is then screwed on tightly, the valve 10 closed, and the filled assembly weighed. Then the filled chamber is placed in an oven which can be an air oven or an oil bath, and heated to a temperature approximating the maximum temperature to which it is expected the mud will encounter during the course of drilling. This may be, for example, in the case of muds used at depths in excess of 10,000 feet in Southwest Texas, 300° F. At such a temperature a pressure will build up in the chamber, largely from water vapor, of some 50 lbs. per square inch gauge. The chamber should be sturdily constructed, however, so that temperatures of at least 350° can be used, which will give a pressure of something of the order of magnitude of 8 atmospheres gauge. Drilling to depths of close to 20,000 feet is now not infrequent, and it is contemplated that still higher test temperatures will be used in testing muds from certain localities.

The mud is left in the test chamber at the elevated temperature chosen for a suitable time. I have found that in general two hours is a sufficient time for any solidification tendencies which the mud may have to manifest themselves, although generally speaking the lower the temperature used, the longer the mud should be left in the chamber at such temperature. Where circulation can take place continuously the maximum temperature which the mud achieves will not be as great as the maximum shut-in bottom hole temperature, but it is not in general possible to maintain continuous circulation, as for example when a bit is changed, and thus from time to time the mud in the bottom of the hole can build up to a temperature approximating that of the shut-in maximum bottom hole temperature. The average time taken for the bit change and other contemplated interruptions of service will be taken into account when the temperature and duration of the test are planned.

After the mud has been held at the selected temperature for the time chosen, the chamber is removed from the bath and allowed to cool. The assembly is then reweighed to assure that no leakage has occurred, then the valve is opened to allow any remaining pressure which may be present to be dissipated, the cap is unscrewed, and the mud is inspected. I have found in most instances where a mud of high clay and shale solids content, high pH, and indifferent treatment has been giving trouble when used at great depths, particularly after periods of interruption of circulation, that the mud will have solidified to the consistency of freshly-set cement slurry. In many cases it is necessary to remove the solidified mud from the chamber with a hammer and chisel.

The mud when thus solidified I have generally found to have lost most if not all of its colloidal properties, and it can only be put in suspension again by regrinding and repulping with water much as hardened set Portland cement can only be redispersed in water by crushing and grinding and reslurrying, and even so will then have lost its original hydraulic properties. I have been able to correlate tests made in this device with the field behavior of the mud during the actual course of drilling a sufficient number of times that I have concluded that the solidification of the type of the pressure chamber test actually takes place at the bottom of the hole, when the temperatures become high enough. I have not observed high pressures to play a part in themselves in the phenomenon, except as they happen to be associated with the high temperatures involved, although it is possible that the high hydrostatic pressures existing at the bottom of the hole, which are not duplicated in the pressure chamber as described, may influence the course of the changes in the mud. It is indeed possible to maintain any desired pressure on the mud during the heating test by means of pressure applied through valve 10 in Figure 1 by forcing oil under pressure into the chamber on top of the mud at this point, but the correlations which I have noted between the chamber tests described and the field behavior of the mud have been close enough that I believe the application of external pressure to be unnecessary in the case of a test to be used for routine control of the treatment of the mud.

Having found that a given mud is subject to solidification of the type described, either by observation of the field behavior of the mud but more particularly and more precisely by the pressure chamber test of the type described, it is necessary to treat the mud so that further drilling can take place safely. I have discovered that a suitable treatment for muds of this type is the addition thereto of very large quantities of an alkaline earth oxide or hydroxide, most conveniently calcium hydroxide, although calcium oxide, barium hydroxide and barium oxide will likewise serve. I am aware that lime is not only used in the original make-up and maintenance of the very muds which undergo the type of solidification described, and indeed lime is a common field treating chemical used in muds of this type. However, it is widely believed and generally assumed that only enough lime need be used to maintain proper flow characteristics of the mud. For example, as the free lime content of such a mud drops to zero or nearly thereto, such a mud thickens up, and it has been the practice to add enough lime so that the mud is restored to a state of low gel strengths and relatively low viscosity. I have discovered, however, that even if this is done such muds still exhibit virtually undiminished any solidification tendencies which they may have. According to the present invention I add a quantity of lime greatly in excess of that used to restore the flow characteristics of the mud, and indeed a quantity of lime which is comparable in magnitude to the amount of clay and shale present.

The following shows the field treatment of a mud in a well being drilled in Hidalgo County, Texas, at a depth in excess of 11,000 feet, where the flow line temperature of the mud was upwards of 150° F.

| Week of— | Material added, pounds | | | | | |
|---|---|---|---|---|---|---|
| | Lime | Caustic | Starch | Bentonite | Barytes | Misc. |
| May 22 | 0 | 1,500 | 0 | 4,000 | 30,000 | 2,250 Q |
| May 29 | 2,000 | 5,000 | 0 | 12,000 | 0 | 4,000 Q |
| June 5 | 3,500 | 3,000 | 0 | 10,000 | 240,000 | 300 D / 1,500 Q |
| June 12 | 6,250 | 3,500 | 0 | 2,000 | 50,000 | 0 |
| June 19 | 0 | 0 | 0 | 3,000 | 50,000 | 0 |
| June 26 | 3,500 | 4,000 | 0 | 2,000 | 100,000 | 1,000 Q |
| July 3 | 5,000 | 4,000 | 0 | 2,500 | 120,000 | 2,000 Q / 1,000 M |
| July 10 | 2,500 | 0 | 0 | 2,000 | 250,000 | 3,000 C |
| July 17 | 2,500 | 0 | 0 | 5,000 | 130,000 | 2,000 M |
| July 24 | 7,500 | 0 | 0 | 5,000 | 350,000 | 2,000 Q |
| July 31 | 2,000 | 2,000 | 0 | 0 | 660,000 | 10,000 C / 400 M |
| Aug. 7 | 4,000 | 2,500 | 0 | 16,000 | 180,000 | 1,200 Q / 400 D |
| Aug. 14 | 3,000 | 2,000 | 0 | 2,000 | 75,000 | 1,000 Q |
| Aug. 21 | 6,000 | 3,000 | 0 | 10,000 | 160,000 | 2,000 Q / 30,000 C |
| Aug. 28 | 0 | 0 | 0 | 0 | 60,000 | 0 |
| Sept. 4 | 2,000 | 0 | 0 | 6,000 | 250,000 | 0 |
| Sept. 11 | 3,500 | 1,500 | 0 | 2,500 | 165,000 | 0 |
| Sept. 18 | 6,000 | 3,500 | 0 | 2,000 | 150,000 | 20,000 C |
| Sept. 25 | 2,000 | 0 | 0 | 0 | 170,000 | 1,500 Q / 200 D |
| Oct. 2 | 0 | 0 | 0 | 0 | 90,000 | 200 D |
| Oct. 9 | 0 | 0 | 0 | 0 | 0 | 0 |
| Oct. 16 | 2,000 | 600 | 0 | 900 | 30,000 | 0 |
| Oct. 23 | 2,500 | 0 | 0 | 0 | 0 | 0 |
| Oct. 30 | 42,500 | 4,900 | 2,000 | 0 | 100,000 | 6,500 Q |
| Nov. 6 | 16,250 | 0 | 3,500 | 1,500 | 77,500 | 8,000 Q / 450 D |
| Nov. 13 | 3,750 | 0 | 1,250 | 0 | 30,000 | 200 D |
| Nov. 20 | 14,500 | 0 | 2,500 | 2,000 | 115,000 | 2,000 C / 2,000 Q |
| Nov. 27 | 10,000 | 0 | 1,500 | 0 | 60,000 | 2,000 Q |

Q=quebracho extract; D=sodium carboxymethylcellulose; C=clay; M=mica.

In the above well, casing had been set at 11,370 ft. prior to the time that the above tabulation begins, so that all of the drilling was in a cased hole. Up until the week of October 30, however, the mud gave such difficulty that very little hole was drilled below the casing, and it may be said that during the entire period represented by the tabulation, less than about 300 feet of new hole was actually drilled. The treatment of the mud, therefore, was not to overcome newly-added material worked into the mud by the drilling operation, for this was a relatively minor quantity of shale compared to the solids already in the mud system. Rather the treatment was on the mud itself which exhibited the peculiar phenomenon described hereinabove, namely, that of solidification upon being held at a high temperature. In the tabulation above, the treatment up to the week of October 30 was the conventional one used in that area, and it will be noted that during the first twenty-three weeks shown in the tabulation, an average of about 2900 pounds per week was the average amount of lime added to the mud system, which because of the fact that the hole was cased did not vary substantially from 600 barrels during the entire period shown in the tabulation. It may readily be computed that this corresponds to approximately ⅔ lb. of lime per barrel per day addition to the mud. On the other hand, the treatments during the five weeks beginning October 30 averaged 17,400 lbs. per week, or 4.1 lbs. per barrel per day, more than six times as much as was used before treatment according to this invention was begun. It will be noted that the mud properties as determined by the standard tests and shown in the above tabulation did not reveal much difference in the mud before and after treatment according to the invention; but testing of the mud in the high-pressure closed vessel as described hereinabove for times generally for 4 to 5 hours at temperatures of 250 to 300° F. showed that the mud in the period prior to the institution of the treatment in the week of October 30 solidified badly, whereas the mud after the treatment was begun in the week of October 30 remained quite fluid even under prolonged testing conditions. That this was an accurate reflection of conditions actually prevailing in the well is shown by the fact that prior to October 30 constant difficulty with the mud was had, it generally being impossible to get back to the "bottom of the hole" after the withdrawal of the bit for any purpose; whereas, if the treatment was begun after the week of October 30 no further difficulty whatsoever was experienced with the mud for the drilling was continued with the treated mud to the desired depth.

Having thus described the invention, what is claimed is:

1. In the treatment of aqueous mud-laden well-drilling fluids subject to solidification at high temperatures and contained in a circulating mud system, the process comprising, subjecting a sample portion of such mud to closed-chamber heating at a temperature in the approximate range of 250 to 350° F. for at least one hour, and treating the mud in the system after a test showing solidification, with sufficient of an alkaline-earth metal alkali so that upon retesting the mud remains fluid.

2. In the treatment of aqueous mud-laden well-drilling fluids subject to solidification at high temperatures and contained in a circulating mud system, the process comprising, subjecting a sample portion of such mud to closed-chamber heating at a temperature in the approximate range of 250° to 350° F. for at least one hour, and treating the mud in the system after a test showing solidification, with sufficient of an alkaline-earth metal alkali chosen from the class consisting of calcium oxide and calcium hydroxide so that upon retesting the mud remains fluid.

3. The process according to claim 2 in which an uncombined lime content of more than 12 lbs. (calculated as calcium hydroxide) per barrel of mud is maintained.

4. In the treatment during the course of drilling of aqueous mud-laden fluids subject to solidification on heating and of pH in excess of 11, the process comprising, adding lime to such mud in average weekly quantities of at least 25 lbs. per barrel of mud added in daily quantities of about 3-4 pounds per barrel, with such additions continued over a period of at least one week.

5. In the treatment during the course of drilling of aqueous mud-laden fluids subject to solidification on heating and of pH in excess of 11 and of a type normally subject to solidification upon standing at high temperatures, the process comprising, adding lime to such mud at a rate equivalent to at least two pounds per cubic foot of formation drilled but only in amounts sufficient to inhibit solidification of the mud.

References Cited in the file of this patent

McCray, Chemistry and Control of Lime Base Drilling Fluids, article in The Petroleum Engineer, Nov. 1949, pages B-54 and B-58.

Article by Battle and Chaney, "Lime Base Muds," World Oil, Apr. 1950, Drilling Sec., pp. 101-108.